United States Patent
Wellbrock et al.

(10) Patent No.: US 7,889,868 B2
(45) Date of Patent: Feb. 15, 2011

(54) QUANTUM KEY DISTRIBUTION SYSTEM

(75) Inventors: Glenn A. Wellbrock, Wylie, TX (US);
Tiejun J. Xia, Richardson, TX (US);
David Z. Chen, Richardson, TX (US)

(73) Assignee: Verizon Business Global LLC, Basking Ridge, NJ (US)

( * ) Notice: Subject to any disclaimer, the term of this patent is extended or adjusted under 35 U.S.C. 154(b) by 1041 days.

(21) Appl. No.: 11/239,328

(22) Filed: Sep. 30, 2005

(65) Prior Publication Data
US 2007/0076884 A1    Apr. 5, 2007

(51) Int. Cl.
*H04K 1/00* (2006.01)
*H04K 1/08* (2006.01)
*H04K 1/10* (2006.01)

(52) U.S. Cl. .................. 380/263; 713/150; 713/168; 713/169; 713/171

(58) Field of Classification Search .................. 380/256, 380/257, 41, 258, 259, 263, 31, 33, 34, 274, 380/35, 42, 43, 278, 284, 44, 45; 359/27, 359/34, 238, 251, 246, 252, 279, 281, 298, 359/341.1, 583, 589; 356/3.02, 3.03, 3.04, 356/460
See application file for complete search history.

(56) References Cited

U.S. PATENT DOCUMENTS

| | | | |
|---|---|---|---|
| 5,093,568 A * | 3/1992 | Maycock | 250/227.14 |
| 5,515,438 A * | 5/1996 | Bennett et al. | 380/278 |
| 5,675,648 A * | 10/1997 | Townsend | 380/278 |
| 5,768,378 A * | 6/1998 | Townsend et al. | 380/256 |
| 6,765,659 B1 * | 7/2004 | Bhatnagar et al. | 356/73.1 |
| 2002/0106084 A1 * | 8/2002 | Azuma et al. | 380/263 |
| 2003/0112970 A1 * | 6/2003 | Mitra | 380/44 |
| 2004/0151321 A1 * | 8/2004 | Lutkenhaus | 380/278 |
| 2004/0184603 A1 * | 9/2004 | Pearson et al. | 380/28 |
| 2005/0078826 A1 * | 4/2005 | Takeuchi | 380/255 |
| 2005/0190921 A1 | 9/2005 | Schlafer | |

FOREIGN PATENT DOCUMENTS

WO   WO/2004/049623   6/2004

OTHER PUBLICATIONS

Hughes, Quantum computing: the final frontier?, Sep. 2000, IEEE Computer Society, Intelligent Systems and Their Applications, vol. 15 Issue 5, pp. 10-18.*

Bechmann-Pasquinucci H et al: "Quantum key distribution with trusted quantum relay," Internet Citation May 13, 2005, pp. 1-13, XP002534289 Retrieved from the Internet: http://www.quantumoptics.it/research/publications/0505089.pdf [retrieved on Jun. 26, 2009]* the whole document *.

* cited by examiner

*Primary Examiner*—Taghi T Arani
*Assistant Examiner*—Kenneth Chang (57) ABSTRACT

A method is provided for distributing quantum cryptographic keys. The method includes receiving a first quantum signal from an initial quantum key generating transmitter. Following correspondence with the initial quantum key generating transmitter, a first quantum key is generated. A second quantum signal is transmitted to a recipient quantum key generating transmitter. Following correspondence with the recipient quantum key generating receiver, a second quantum key is generated. The first quantum key is encoded using the second quantum key. The encoded first quantum key is transmitted to the recipient quantum key generating receiver using the second quantum key.

17 Claims, 11 Drawing Sheets

QUANTUM KEY DISTRIBUTION SYSTEM

FIELD OF THE INVENTION

The present invention relates generally to cryptographic systems and, more particularly, to systems and methods for enabling distribution of quantum cryptographic keys across extended distances.

BACKGROUND OF THE INVENTION

Secure data transmission in modern computer networks may be employed through the use of a private key shared among the sending and receiving parties. Provided that the private key itself remains secure, deciphering of data encoded with the private key is virtually computationally impossible, should the encrypted data be intercepted. Accordingly, the strength of the private key cryptographic system depends, among other things, on the manner in which the private key is distributed. Should the private key be intercepted, e.g., during transmission between the parties, resulting ciphertext may be exposed.

Figure 1:
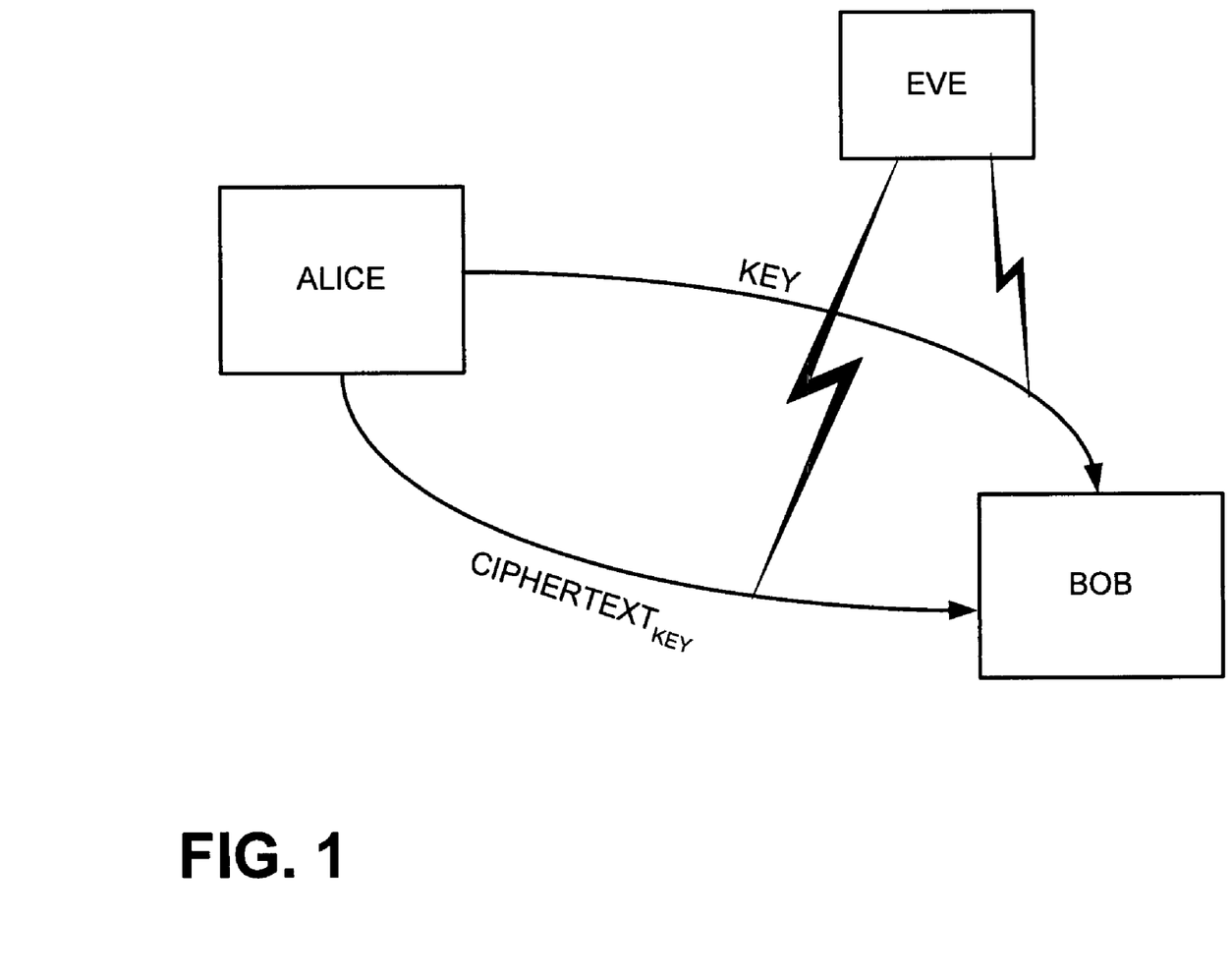
FIG. 1 illustrates cryptographic key distribution and ciphertext communication.

FIG. 1 shows one form of a conventional key distribution process. As shown in FIG. 1, for a party, Bob, to decrypt ciphertext encrypted by a party, Alice, Alice or a third party must share a copy of the key with Bob. This distribution process may be implemented in a number of conventional ways including the following: 1) Alice can select a key and physically deliver the key to Bob; 2) a third party can select a key and physically deliver the key to Bob; 3) if Alice and Bob both have an encrypted connection to a third party, the third party can deliver a key on the encrypted links to Alice and Bob; 4) if Alice and Bob have previously used an old key, Alice can transmit a new key to Bob by encrypting the new key with the old key; and 5) Alice and Bob may agree on a shared key via a one-way mathematical algorithm, such as Diffie-Helman key agreement.

Unfortunately, each of these distribution methods are vulnerable to interception of the distributed key by an eavesdropper Eve, or by Eve "cracking" the supposedly one-way algorithm. Eve can eavesdrop and intercept, or copy, a distributed key and then subsequently decrypt any intercepted ciphertext that is sent between Bob and Alice. In conventional cryptographic systems, this eavesdropping may go undetected, with the result being that any ciphertext sent between Bob and Alice is compromised.

To combat these inherent deficiencies in the key distribution process, a key distribution technique called quantum cryptography has been developed. Quantum cryptography employs quantum systems and applicable fundamental principles of physics to ensure the security of distributed keys. Heisenberg's uncertainty principle mandates that any attempt to observe the state of a quantum system will necessarily induce a change in the state of the quantum system. Thus, when very low levels of matter or energy, such as single or individual photons, are used to distribute keys, the techniques of quantum cryptography permit the key distributor and receiver to determine, with certainty, whether any eavesdropping has occurred during the distribution of the key. Quantum cryptography, therefore, prevents an eavesdropper, like Eve, from copying or intercepting a key that has been distributed from Alice to Bob without a significant probability of Bob's or Alice's discovery of the eavesdropping.

One quantum key distribution (QKD) scheme involves a quantum channel, through which Alice and Bob send keys using individual polarized or phase encoded photons, and a public channel, through which Alice and Bob send ordinary non-encoded messages. The quantum channel is a path, such as through air or an optical fiber, that attempts to minimize the QKD photons' interaction with the environment. The public channel may include a channel on any type of communication network such as a Public Switched Telephone network, the Internet, or a wireless network. An eavesdropper, Eve, may attempt to measure the photons on the quantum channel. Such eavesdropping, however, will induce a measurable disturbance in the photons in accordance with the Heisenberg uncertainty principle. Alice and Bob use the public channel to discuss and compare the photons sent through the quantum channel. If, through their discussion and comparison, they determine that there is no evidence of eavesdropping, then the key material distributed via the quantum channel can be considered completely secret.

Figure 2:
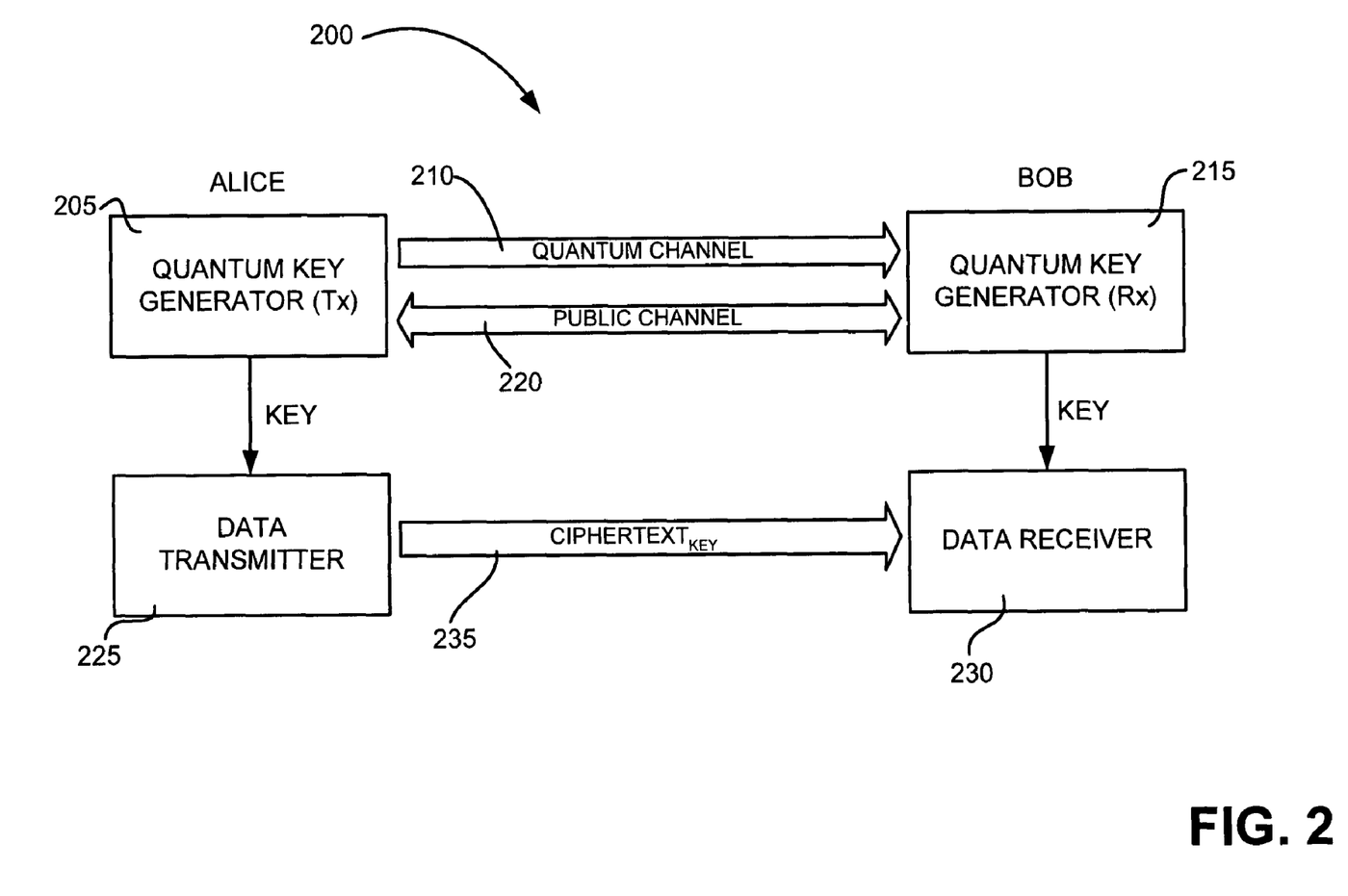
FIG. 2 illustrates a quantum cryptographic key distribution (QKD) process.
Figure 3:
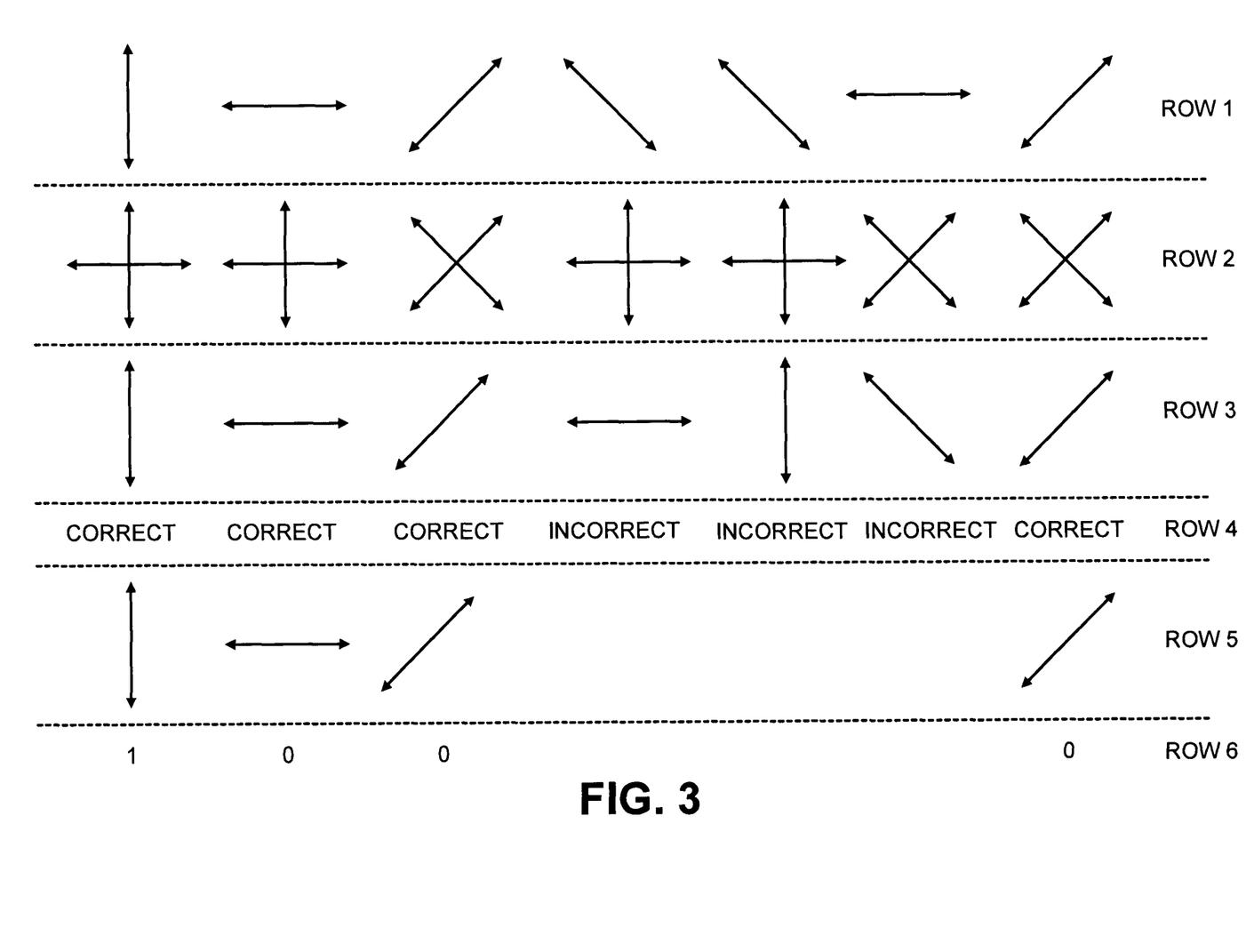
FIG. 3 illustrates quantum cryptographic sifting.

FIGS. 2 and 3 illustrate a scheme 200 for quantum key distribution in which the polarization of each photon is used for encoding cryptographic values. Initially, Alice's quantum key generator 205 generates random bit values and bases and then encodes the bits as polarization states in sequences of individual photons sent via the quantum channel 210 (see row 1 of FIG. 3). Alice does not tell anyone the polarization of the photons she has transmitted. Bob's quantum key generator 215 receives the photons and measures their polarization along either a rectilinear or diagonal basis that is randomly selected with substantially equal probability. Bob records his chosen basis (see row 2 of FIG. 3) and his measurement results (see row 3 of FIG. 3). Bob and Alice then discuss, via a public channel 220, which basis Bob has chosen to measure each photon (e.g., row 2 of FIG. 3). Bob, however, does not inform Alice of the result of his measurements (e.g., row 3 of FIG. 3). Alice tells Bob, via the public channel, whether he has made the measurement along the correct basis (see row 4 of FIG. 3). Then, in a process referred to as "sifting", both Alice and Bob discard all cases in which Bob has made the measurement along the wrong basis and keep only the ones in which Bob has made the measurement along the correct basis (see row 5 of FIG. 3).

Once the photons have been sifted, Alice and Bob adopt the remaining polarizations, or some algebraic combination of their values, as secret bits of a shared secret key, interpreting horizontal or 45 degree polarized photons as binary 0's and vertical or 135 degree photons as binary 1's (see row 6 of FIG. 3). The keys are then used by data transmitter 225 and data receiver 230 to encrypt and decrypt subsequent data transmissions via ciphertext channel 235.

Unfortunately, due to the very quantum characteristics which enable secure generation of the keys, conventional QKD techniques are physically limited to distribution over a single span or hop, typically on the order of 80 km or less. For transmissions of longer than about 80 km, optical amplification is typically required. During such amplification, however, the quantum state of the transmitted key generation photons is modified, thereby disrupting key generation.

SUMMARY OF THE INVENTION

Systems and methods consistent with the invention implement a system for distributing a quantum cryptographic key. The system includes a quantum key generating transmitter for transmitting a first quantum signal over a first network span. An intermediate key forwarding device is configured to receive the quantum bits from the first quantum key generating transmitter, correspond with the quantum key generating transmitter, correspond to generate a first quantum key based on the first quantum signal, and transmit a second quantum signal over a second network span. A quantum key generating receiver is configured to receive the second quantum signal from the intermediate key forwarding device, and correspond with the intermediate key forwarding device to generate a second quantum key based on the second quantum signal. The intermediate key forwarding device is further configured to encode the first quantum key based on the second quantum key and transmit the encoded first quantum key to the quantum key generating receiver. The quantum key generating receiver is configured to receive and decode the encoded first quantum key.

Another aspect of the present invention is directed to a method for distributing quantum cryptographic keys. The method includes receiving a first quantum signal from an initial quantum key generating transmitter; corresponding with the initial quantum key generating transmitter to generate a first quantum key; transmitting a second quantum signal to a recipient quantum key generating transmitter; corresponding with the recipient quantum key generating receiver to generate a second quantum key; encoding the first quantum key using the second quantum key; and transmitting the encoded first quantum key to the recipient quantum key generating receiver.

Yet another aspect of the present invention is directed to a device for distributing a quantum key over a long haul network. The device may include an intermediate key generating receiver configured to receive a first quantum signal from an initial key generating transmitter, and communicate with the initial key generating transmitter to generate a first key based on the first quantum signal. An intermediate key generating transmitter is configured to transmit a second quantum signal to a recipient key generating receiver, communicate with the recipient key generating receiver to generate a second key based on the second quantum signal, encode the first key using the second key, and transmit the encoded first key to the recipient key generating receiver using the second key.

Still another aspect of the present invention is directed to a method for transmitting quantum and public data using a single channel. The method includes transmitting a time-shared signal alternately including a quantum signal and a public data signal; applying high attenuation to the time-shared signal during quantum signal time slices; and applying low attenuation to the time-shared signal during public channel signal time slices.

BRIEF DESCRIPTION OF THE DRAWINGS

The accompanying drawings, which are incorporated in and constitute a part of this specification, illustrate exemplary embodiments of the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims. Systems and methods consistent with the invention enable long-haul distribution of cryptographic keys via quantum cryptographic mechanisms.

Exemplary System

Figure 4:
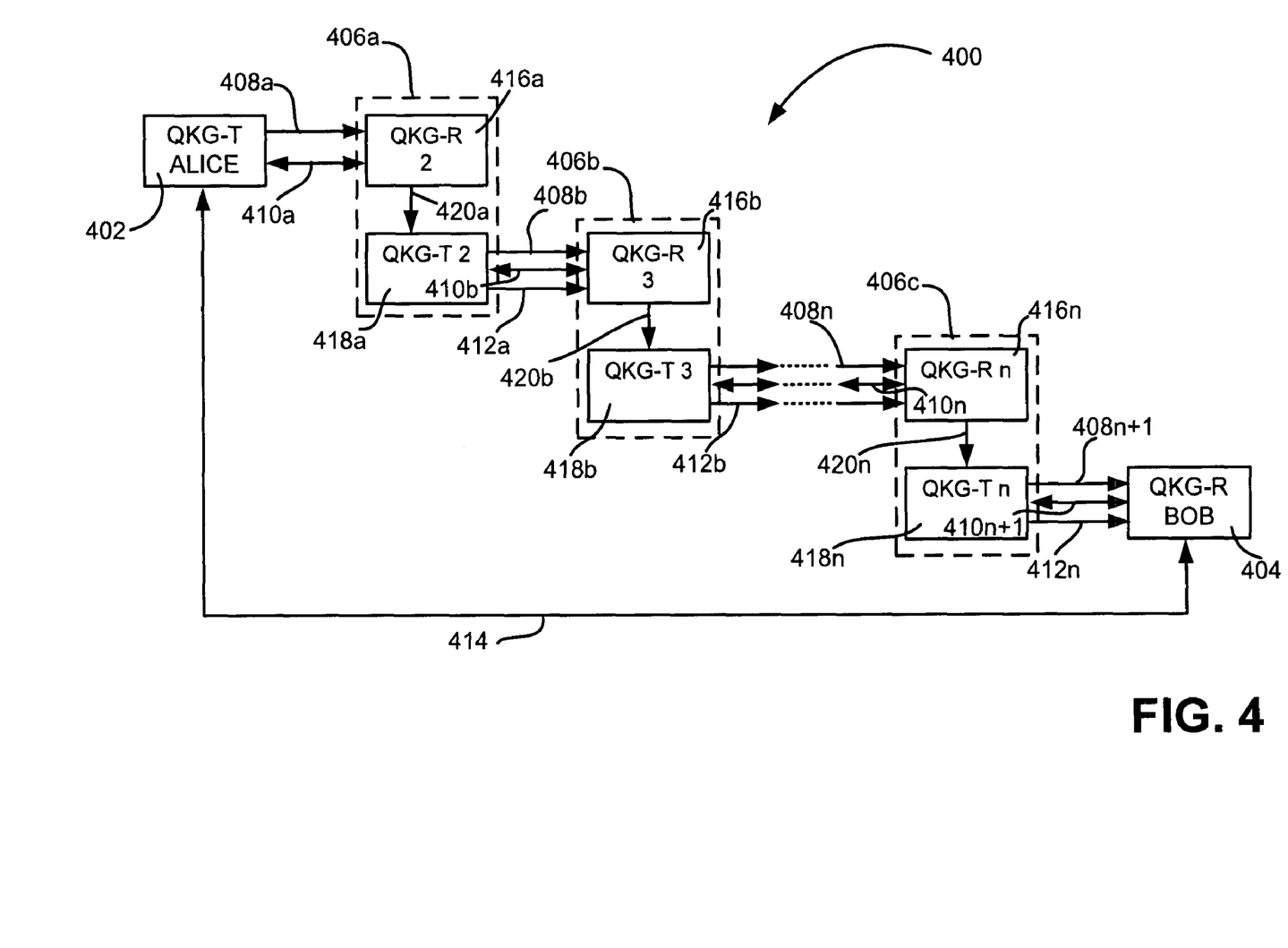
FIG. 4 illustrates an exemplary network in which systems and methods, consistent with the invention, may be implemented.

FIG. 4 illustrates an exemplary system 400 in which systems and methods, consistent with the principles of the invention, that distribute encryption keys via quantum cryptographic mechanisms may be implemented. System 400 may include initial transmitting quantum key generator (QKG-T) 402, recipient receiving quantum key generator (QKG-R) 404, intermediate key forwarding devices 406a, 406b, and 406n (collectively, "key forwarding devices 406"), quantum channels 408a, 408b, 408n, and 408n+1 (collectively, "quantum channels 408"), public channels 410a, 410b, 410n, and 410n+1 (collectively, "public channels 410"), intermediate ciphertext channels 412a, 412b, and 412n (collectively, "intermediate ciphertext channels 412"), and resultant ciphertext channel 414. Although three intermediate key forwarding devices 406 are shown in FIG. 4 for reasons of simplicity, it should be understood that any number of key forwarding devices may be implemented in accordance with principles of the invention. Furthermore, it should be noted that intermediate key forwarding devices 406 are configured to provide secure operation using any suitable means, such as tamperproof enclosures, as well as any suitable authentication and restricted access measures. In this way, potential exposure of key information is substantially reduced.

Intermediate key forwarding devices 406 may include secure intermediate QKG-R's 416a, 416b, and 416n and secure intermediate QKG-T's 418a, 418b, and 418n connected by secure links 420a, 420b, and 420n, respectively. Quantum channels 408 may include any suitable optical or freespace communications medium, such as a wavelength division multiplexing (WDM) network supported via optical fibers. Public channels 410 and ciphertext channels 412 and 414 may include one or more communications mediums of any type, including a Public Land Mobile Network (PLMN), Public Switched Telephone Network (PSTN), LAN, metropolitan area network (MAN), wide area network (WAN), Internet, or Intranet. The one or more PLMNs may further include packet-switched sub-networks, such as, for example, General Packet Radio Service (GPRS), Cellular Digital Packet Data (CDPD), and Mobile IP sub-networks.

Quantum channels 408 may include a link that may carry light throughout the electromagnetic spectrum, including light in the human visible spectrum and light beyond the human-visible spectrum, such as, for example, infrared or ultraviolet light. The link may include, for example, a conventional optical fiber. Alternatively, the link may include a free-space optical path, such as, for example, a path through the atmosphere or outer space, or even through water or other transparent media. As another alternative, the link may include a hollow optical fiber that may be lined with photonic band-gap material.

In operation, an initial quantum key generated between initial QKG-T 402 associated with Alice and intermediate key forwarding devices 406 may be propagated through network 400 to recipient QKG-R 404 associated with Bob, where Alice and Bob may be separated by distances greater than one optical span (e.g., about 80 km). Following such propagation, Alice and Bob may communicate using the distributed quantum key.

Exemplary Intermediary Key Forwarding Device

Figure 5:
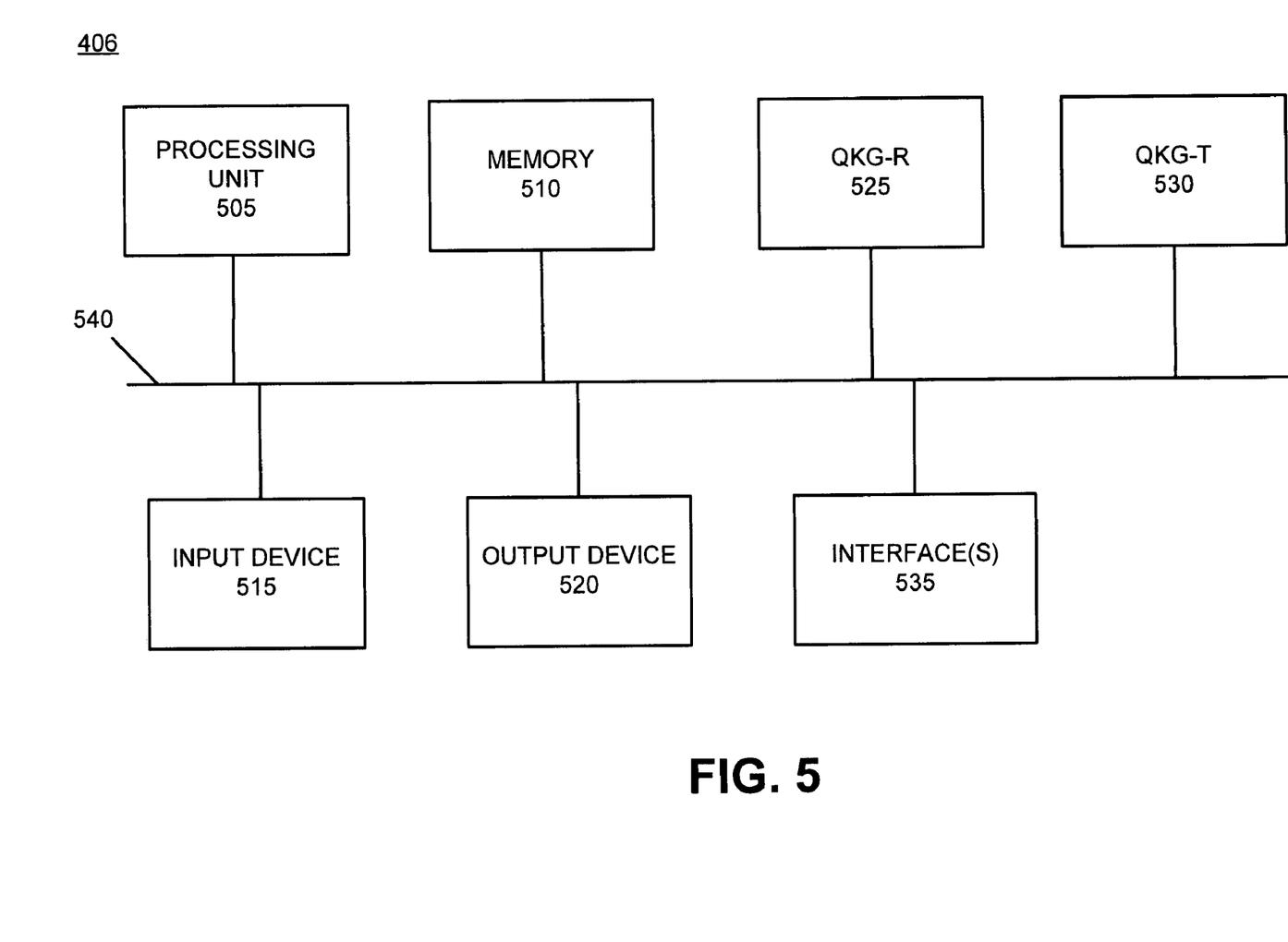
FIG. 5 illustrates exemplary components of an intermediate key forwarding device consistent with the principles of the present invention.

FIG. 5 illustrates exemplary components of an intermediate key forwarding device 406 consistent with the principles of the present invention. Intermediate key forwarding device 406 may include a processing unit 505, a memory 510, an input device 515, an output device 520, a receiving quantum key generator (QKG-R) 525, a transmitting quantum key generator (QKG-T) 530, an interface(s) 535, and a bus 540. It will be appreciated that intermediate key forwarding device 406 may include other components (not shown) that aid in receiving, processing, and/or transmitting, signals.

Processing unit 505 may perform all data processing functions of inputting, outputting, and processing for intermediate key forwarding device 406. Memory 510 may include a Random Access Memory (RAM) that provides temporary working storage of data and instructions for use by processing unit 505 in performing processing functions. Memory 510 may additionally include a Read Only Memory (ROM) that provides permanent or semi-permanent storage of data and instructions for use by processing unit 505. Memory 510 can also include large-capacity storage devices, such as a magnetic and/or optical recording medium and its corresponding drive.

Input device 515 permits entry of data into intermediate key forwarding device 406 and may include a user interface (not shown). Output device 520 permits the output of data in video, audio, and/or hard copy format. QKG-R 525 and QKG-T 530 may include mechanisms for receiving and transmitting encryption keys using quantum cryptographic techniques. Interface(s) 535 may interconnect intermediate key forwarding device 406 with channels 408/410/412. Bus 540 interconnects the various components of intermediate key forwarding device 406 to permit the components to communicate with one another.

Figure 6:
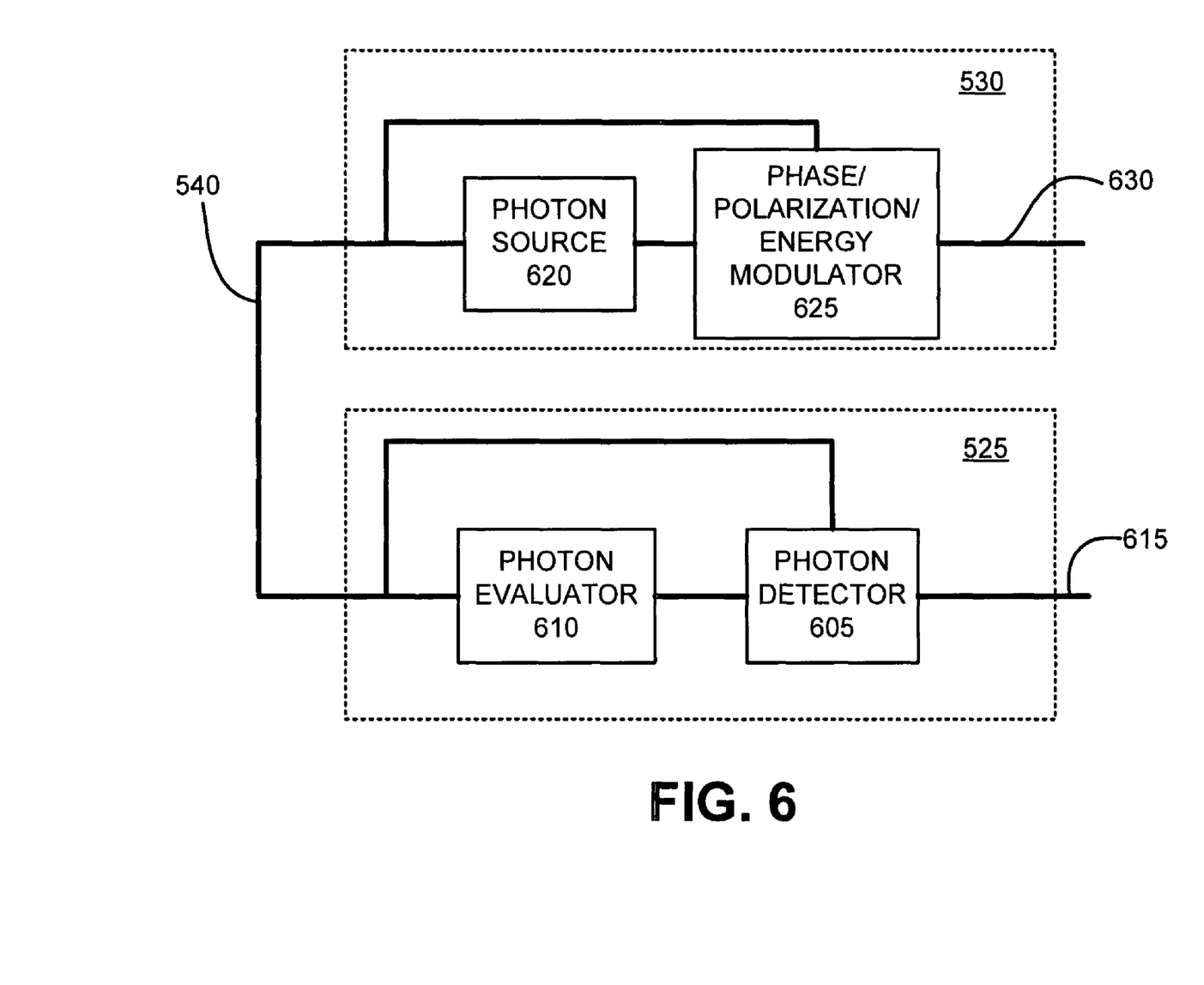
FIG. 6 illustrates an exemplary quantum key generating receiver and transmitter consistent with the principles of the present invention.

FIG. 6 illustrates exemplary components of QKG-R 525 and QKG-T 530 of intermediate key forwarding device 406 consistent with principles of the invention. QKG-R 525 may include a photon detector 605 and a photon evaluator 610 for receiving incoming photons via optical link 615. Photon detector 605 may include, for example, conventional avalanche photo detectors (APDs) or conventional photo-multiplier tubes (PMTs). Photon detector 605 may also include cryogenically cooled detectors that sense energy via changes in detector temperature or electrical resistivity as photons strike the detector apparatus. Photon detector 605 may detect photons received across optical link 615. Photon evaluator 610 may include circuitry for processing and evaluating output signals from photon detector 605 in accordance with quantum cryptographic techniques.

QKG-T 530 may include a photon source 620 and a phase/polarization/energy modulator 625. Photon source 620 may include, for example, a laser and may produce photons according to instructions provided by processing unit 505. Photon source 620 may produce photons of light with wavelengths throughout the electromagnetic spectrum, including light in the human visible spectrum and light beyond the human-visible spectrum, such as, for example, infrared or ultraviolet light. Phase/polarization/energy modulator 625 may include, for example, conventional Mach-Zehnder interferometers and may encode outgoing photons from the photon source according to commands received from processing unit 505 for transmission across an optical link, such as link 630.

Exemplary Processing

Figure 7:
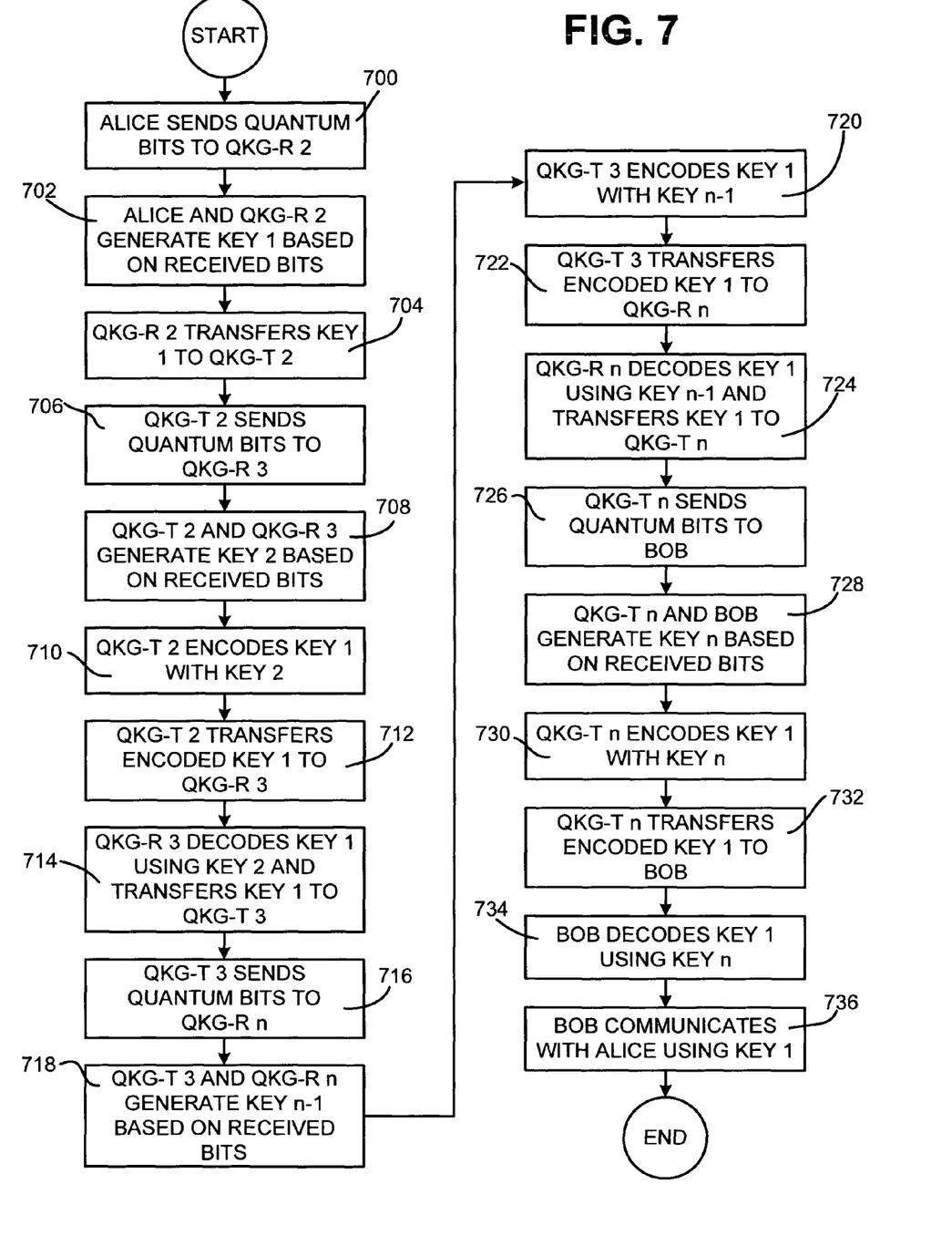
FIG. 7 is a flow diagram illustrating one exemplary method for distributing and using a quantum cryptographic key using the system of FIG. 4.

FIG. 7 is a flow diagram illustrating one exemplary method for distributing and using a quantum cryptographic key via system 400 of FIG. 4. Initially, QKG-T Alice (402) generates random bit values and bases, encodes the bits as polarization states in sequences of individual photons and sends the bits to QKG-R 2 (416a) included within intermediate key forwarding device (406a) via quantum channel 408a (act 700). In the manner described above, QKG-T Alice (402) and QKG-R 2 (416a) sift the received bits by corresponding over public channel (410a) and generate a first key (KEY 1) based on the received and sifted bits (act 702).

Following generation of KEY 1, QKG-R 2 (416a) transfers KEY 1 to QKG-T 2 (418a) via secure link (420a) (act 704). QKG-T 2 (418a) generates new quantum bits and sends the bits to QKG-R 3 (416b) included within the second intermediate key forwarding device (406b) via quantum channel 408b (act 706). QKG-T 2 (418a) and QKG-R 3 (416b) then sift the received bits via public channel (410b) and generate a second key (KEY 2) based on the received and sifted bits (act 708). QKG-T 2 then encodes KEY 1 using KEY 2 (act 710) and transfers the encoded KEY 1 to QKG-R 3 (416b) via intermediate ciphertext channel (412a) (act 712).

QKG-R 3 (416b) decodes KEY 1 using KEY 2 and transfers KEY 1 to QKG-T 3 (418b) via secure path (420b) (act 714). QKG-T 3 (418b) then generates new quantum bits and sends the new bits to QKG-R n (416n) included within the $n^{th}$ intermediate key forwarding device (406n) via quantum channel 408n (act 716). QKG-T 3 (418b) and QKG-R n (416n) then sift the received bits via public channel (410n) and generate an n-$1^{th}$ key (KEY n-1) based on the received and sifted bits (act 718). QKG-T 3 then encodes KEY 1 using KEY n-1 (act 720) and transfers the encoded KEY 1 to QKG-R n (416n) via intermediate ciphertext channel (412b) (act 722).

QKG-R n (416n) decodes KEY 1 using KEY n-1 and transfers KEY 1 to QKG-T n (418b) via secure path (420n) (act 724). QKG-T n (418n) then generates new quantum bits and sends the new bits to QKG-R Bob (404) via quantum channel 408n+1 (act 726). QKG-T n (418n) and QKG-R Bob (404) then sift the received bits via corresponding along public channel (410n+1) and generate an $n^{th}$ key (KEY n) based on the received and sifted bits (act 728). QKG-T n (418n) then encodes KEY 1 using KEY n (act 730) and transfers the encoded KEY 1 to QKG-R Bob (404) via intermediate ciphertext channel (412n) (act 732).

QKG-R Bob (404) decodes KEY 1 using KEY n (act 734). Following decoding of KEY 1, Bob and Alice may exchange ciphertext messages encoded using KEY 1 via resultant ciphertext channel (414) (act 736). By enabling secure propagation of KEY 1 through n intermediate key forwarding devices, the system of FIG. 4 provides support for quantum key distribution across previously unsupported long haul networks.

Figure 8:
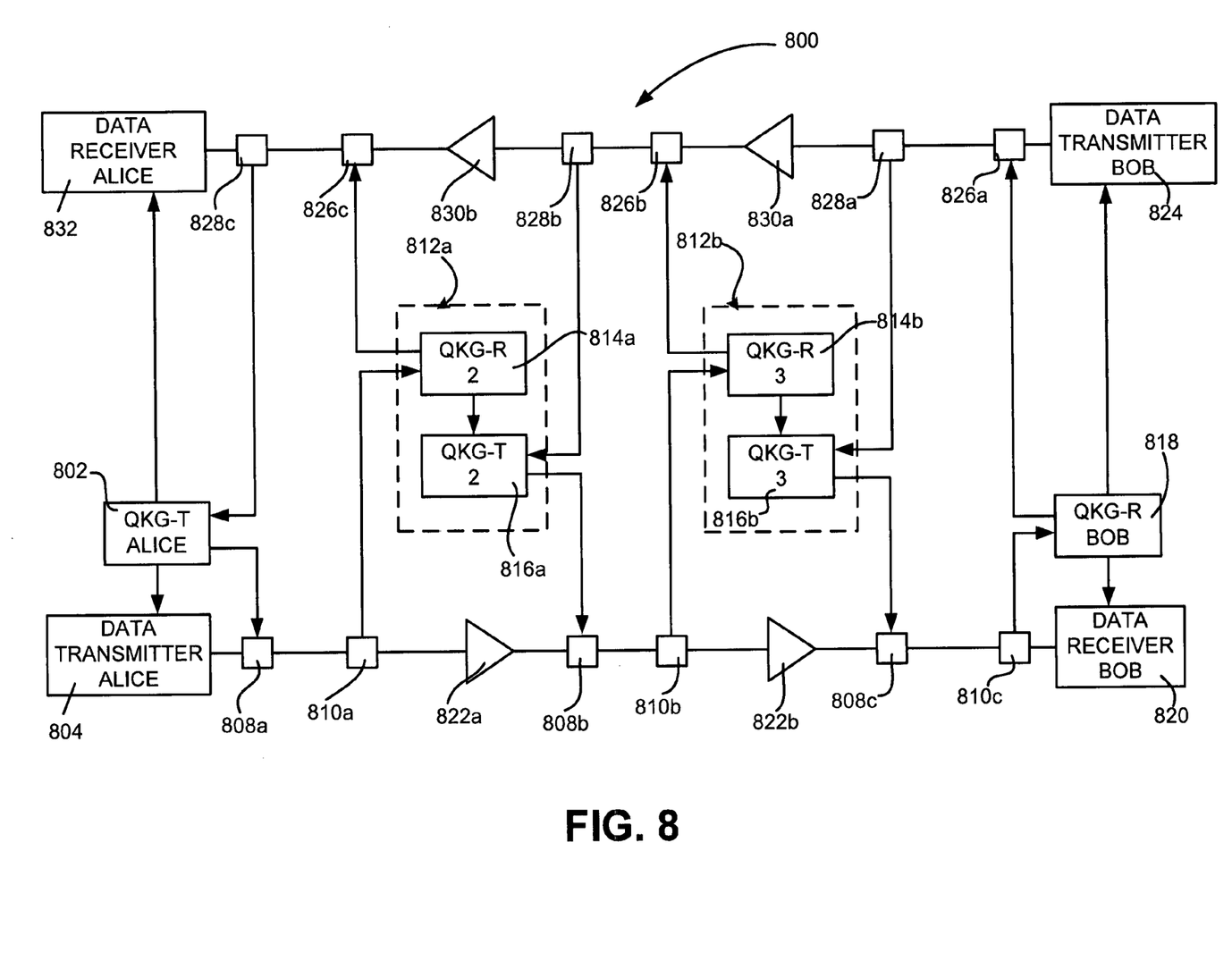
FIG. 8 is a block diagram illustrating an exemplary system in which systems and methods, consistent with the principles of the invention, may be implemented.

FIG. 8 is a block diagram illustrating an exemplary system 800 in which systems and methods, consistent with the principles of the invention, may be implemented. System 800 may include Alice's quantum key generator 802, Alice's data transmitter 804, a number of multiplexers 808a-808c and 826a-826c, a number of demultiplexers 810a-810c and 828a-828c, a pair of intermediate key forwarding devices 812a and 812b, each including an intermediate QKG receiver and transmitter (814a and 814b and 814a and 816b, respectively), Bob's quantum key generator 818, Bob's data receiver 820, a number of optical amplifiers 822a-822b and 830a-830b, Bob's data transmitter 824, and Alice's data receiver 832. Although only two intermediate key forwarding devices 812 and numerous related elements are shown in FIG. 4, it should be understood that more or fewer devices may be used in accordance with principles of the invention.

In operation, Alice's QKG transmitter 802 (QKG-T Alice) sends quantum bits to the first multiplexer 808a, where it is combined with other signals (e.g., data signals from data transmitter 804) and forwarded to first demultiplexer 810a. In practice, each pair of multiplexers 808 and demultiplexers 810 (as well as each pair of multiplexers 826 and demultiplexers 828) are separated by one span or hop, typically less than 80 km in length. As mentioned above, signals traveling distances further than one span typically need to be optically amplified or enhanced prior to delivery.

Upon receipt at demultiplexer 810a, the quantum bits are separated from the received signal and forwarded to the first intermediary key forwarding device 812a and, specifically, to intermediate QKG receiver 814a (QKG-R 2) included therein. QKG-R 2 then corresponds with Alice's QKG 802 via multiplexer 826c and demultiplexer 828c to define the value of a first quantum key (KEY 1). Once KEY 1 has been generated, it is passed to intermediate QKG transmitter 816a (QKG-2 T) for propagation through system 800.

QKG-T 2 816a then sends a new set of quantum bits to the second multiplexer 808b in the second span, where it may be combined with other, possibly amplified, signals (e.g., data signals from data transmitter 804) and forwarded to second demultiplexer 810b. Upon receipt at demultiplexer 810b, the second set of quantum bits are separated from the received signal and forwarded to the second intermediary key forwarding device 812b and, specifically, to intermediate QKG receiver 814b (QKG-R 3) included therein. QKG-R 3 814b then corresponds with QKG-T 2 816a via multiplexer 826b and demultiplexer 828b to define the value of a second quantum key (KEY 2). Once KEY 2 has been generated, QKG-T 2 816a then encodes KEY 1 using KEY 2 and transmits the encoded KEY 1 to QKG-R 3 814b. QKG-R 3 814b decodes KEY 1 and passes it to QKG-T 3 816b for continued propagation through system 800.

QKG-T 3 816b then sends a third set of quantum bits to the third multiplexer 808c in the third span, where it may again be combined with other, possibly amplified, signals (e.g., data signals from data transmitter 804) and forwarded to second demultiplexer 810c. Upon receipt at demultiplexer 810c, the third set of quantum bits are separated from the received signal and forwarded to Bob's QKG receiver 818 (QKG-R Bob) included therein. QKG-R Bob 818 then corresponds with QKG-T 3 816b via multiplexer 826a and demultiplexer 828a to define the value of a third quantum key (KEY 3). Once KEY 3 has been generated, QKG-T 3 816b the encodes KEY 1 using KEY 3 and transmits the encoded KEY 1 to QKG-R Bob 818. QKG-R Bob 818 then decodes KEY 1 using KEY 3.

Once KEY 1 is successfully decoded by QKG-R Bob 818, data may be encrypted by either Bob or Alice and transferred between the parties over the entire long haul system 800, via multiplexers 808a-808c and 826a-826c, demultiplexers 810a-810c and 828a-828c, and optical amplifiers 822a-822b and 830a-830b.

Figure 9:
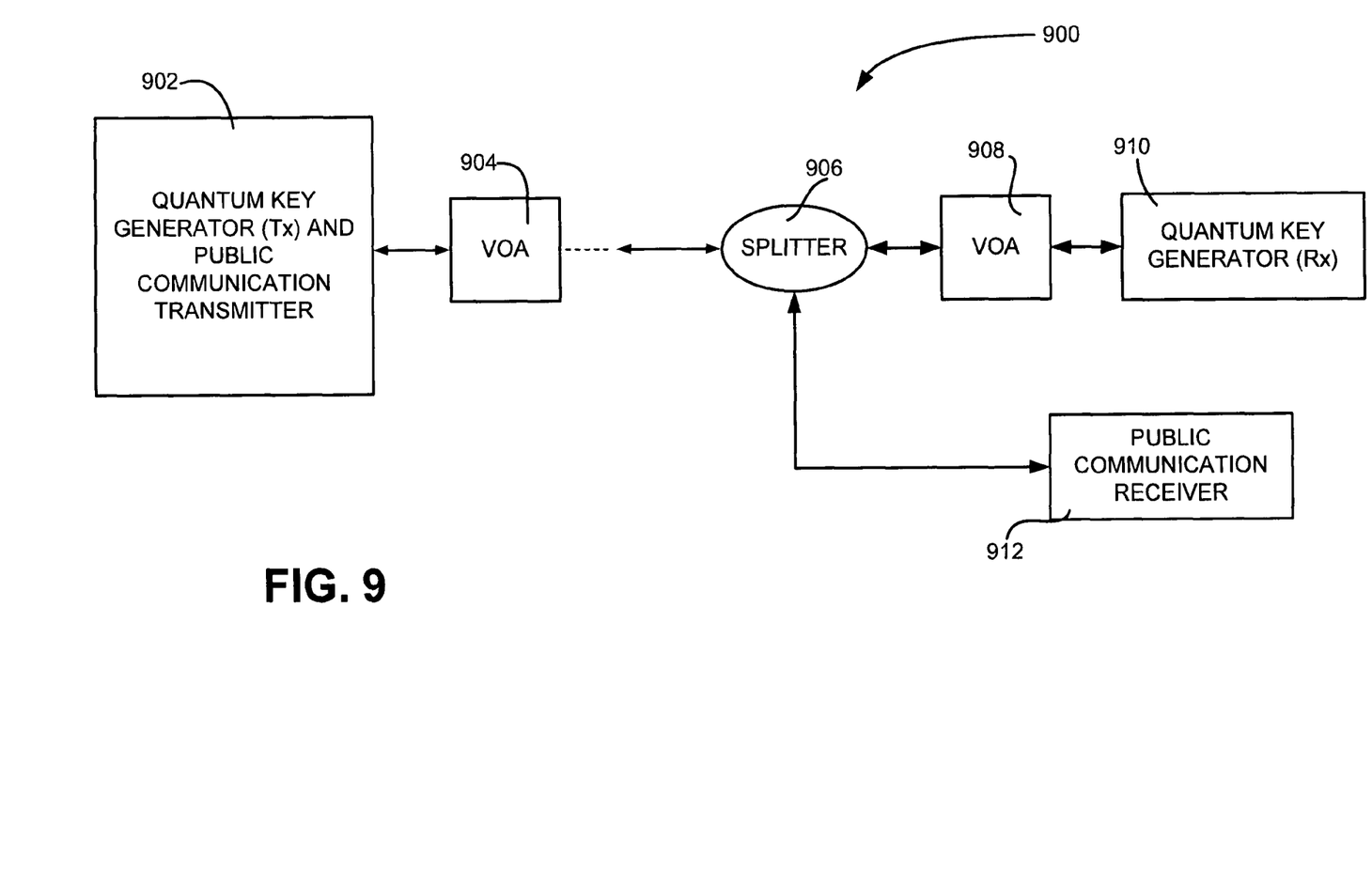
FIG. 9 is a block diagram illustrating a system for consolidating quantum key generation and public channel communications into a single wavelength.

FIG. 9 is a block diagram illustrating a system 900 for consolidating quantum key generation and public channel communications into a single wavelength. In one implementation consistent with principles of the invention, the elements of system 900 may be incorporated into systems such as systems 400 and 800 as shown in FIGS. 4 and 8, respectively, to simplify cabling and transmission requirements for the respective systems.

System 900 may include a combined transmission device 902, a first attenuation device 904, an optical splitter 906, a second attenuation device 908, a quantum key generator receiver 910, and a public communications receiver 912. In operation, combined transmission device 902 generates both single photon quantum key transmissions and multi-photon public communications transmissions in a time sharing manner. That is, device 902 alternately outputs quantum bits and public channel data to first attenuation device 904. In one implementation, each type of signal is output for 1 μs, although any suitable time scale may be used in accordance with the present invention.

Device 902 and first and second attenuation devices 904 and 908 are synchronized such that, as device 902 outputs each respective signal, the attenuation devices 904 and 908 (e.g., variable optical attenuators (VOA's)) also modify their performance to allow propagation of the proper type of signal. More particularly, for each quantum key time slice, first attenuation device 904 may add a high attenuation to the signal, thereby lowering the power of the output signal. For each public channel transmission time slice, the applied attenuation may be removed or otherwise reduced, resulting in a higher power signal relative to the quantum key generation signal. Following action by first attenuator 904, the signal is transmitted to optical splitter 906.

Optical splitter 906 then duplicates the received signal and outputs the originally received signal to second attenuator 908 and outputs the duplicated signal to public communications receiver 912. In accordance with the synchronized timing with transmitter device 902 and first attenuator 904, during the quantum signal time slices, second attenuator 908 is turned off or applies a reduced attenuation, thereby enabling quantum key generator receiver 910 to "see" the single photon. However, during public communications time slice, second attenuator 908 applies a high attenuation thereby protecting the quantum key generator receiver 910. In this instance, the split signal is read by public communications receiver 912.

Figure 10:
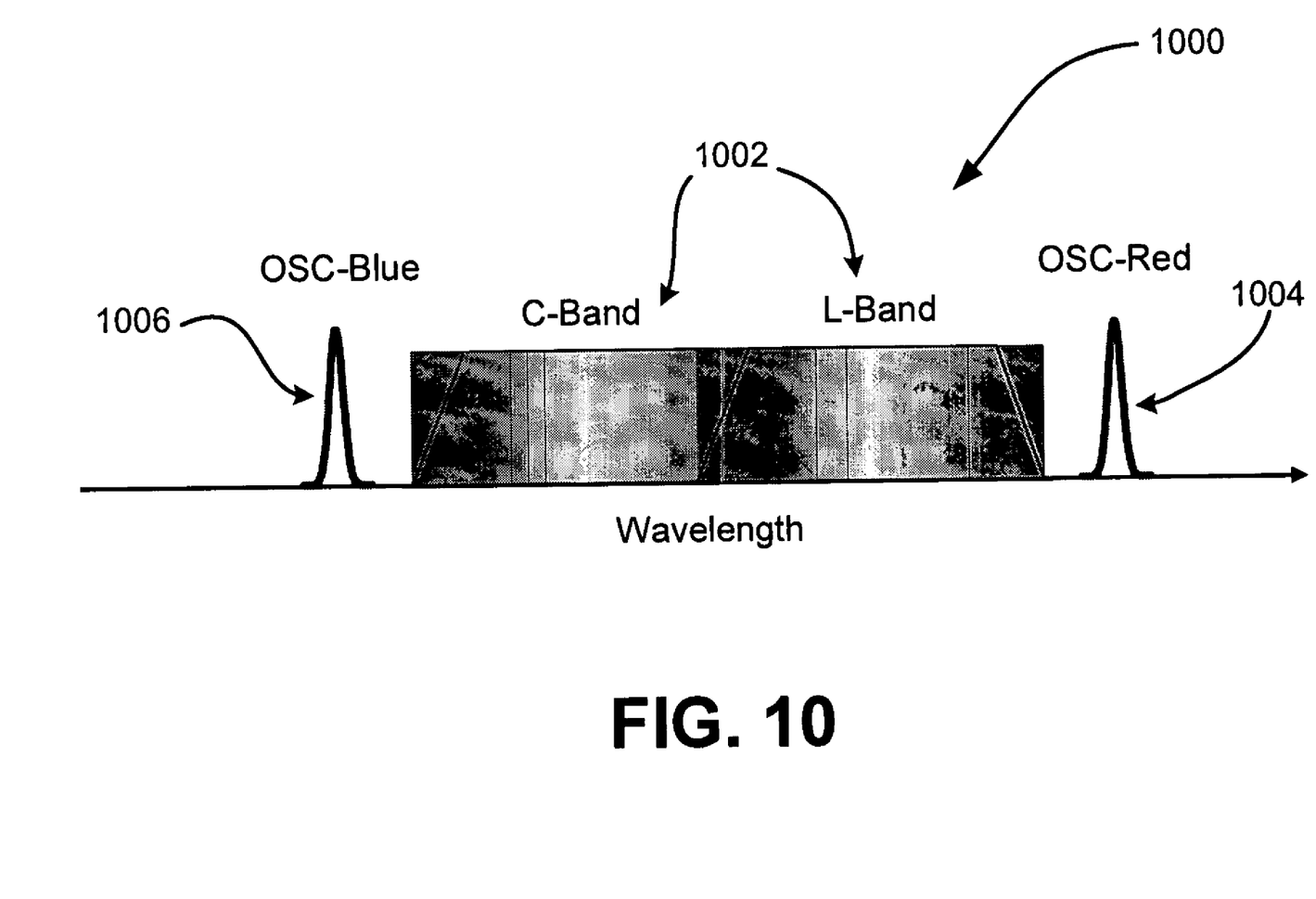
FIG. 10 is a graphical illustration of one exemplary implementation of a WDM spectrum used to simultaneously transmit data, control data, and the quantum key generation information.

FIG. 10 is a graphical illustration of one exemplary implementation of a WDM spectrum 1000 used to simultaneously transmit data, control data, and the quantum key generation information. In accordance with one implementation consistent with principles of the invention, WDM spectrum 1000 may include data carrying wavelengths 1002, a first optical supervisory channel (OSC) 1004 for carrying supervisory or control information, and a second OSC 1006 for carrying quantum key generation bits. In one embodiment, first OSC 1004 may be the red wavelength OSC and second OSC 1006 may be the blue wavelength OSC. By providing a single spectrum 1000 capable of transmitting both public channel data and quantum key generating bits, the system of FIG. 9 may be able to incorporate each type of signal into a single transmission medium.

Additional Embodiments

Figure 11A:
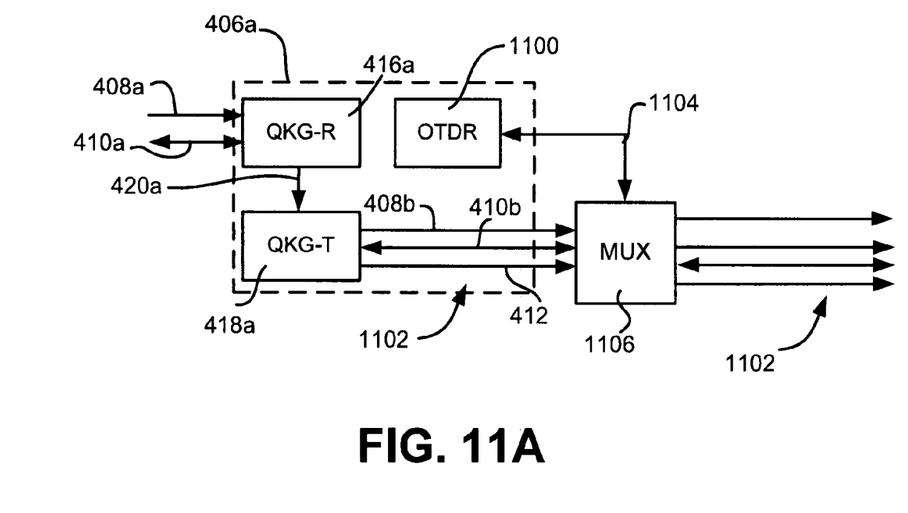
FIGS. 11A and 11B are block diagrams illustrating other exemplary embodiments of an intermediate key forwarding device consistent with principles of the invention.

FIG. 11A illustrates another exemplary embodiment of an intermediate key forwarding device 406a consistent with principles of the invention. Intermediate key forwarding devices 406a may include a secure intermediate quantum key generating receiver (QKG-R) 416a, a secure intermediate quantum key generating transmitter (QKG-T) 418a, and an optical time domain reflectometer (OTDR) 1100. As described above, QKG-R and QKG-T may be connected by a secure link 420a. Additionally, quantum channels 4088, 408b, public channels 410a, 410b, and ciphertext channel 412 may be formed within one or more optical fibers 1102 and may be connected to intermediate key forwarding device 406a to enable propagation of quantum keys in the manner set forth in detail above.

In accordance with one implementation consistent with principles of the invention, OTDR 1110 may be provided on a downstream side of intermediate key forwarding device 406a to enhance monitoring of quantum signal interception. OTDR 1110 may be operatively coupled or combined with optical fiber 1102 via fiber 1104 and multiplexer or similar device 1106. In operation, OTDR 1110 detects quantum signal anomalies, such as the presence of an eavesdropper, by transmitting a high intensity light pulse into fiber 1104. The light travels through fiber 1104, multiplexer 1106 and fiber 1102 until an anomaly is detected. The presence of such an anomaly, an eavesdropper in this case, results in light being reflected back to OTDR 1110, where the distance to the anomaly may be determined.

Figure 11B:
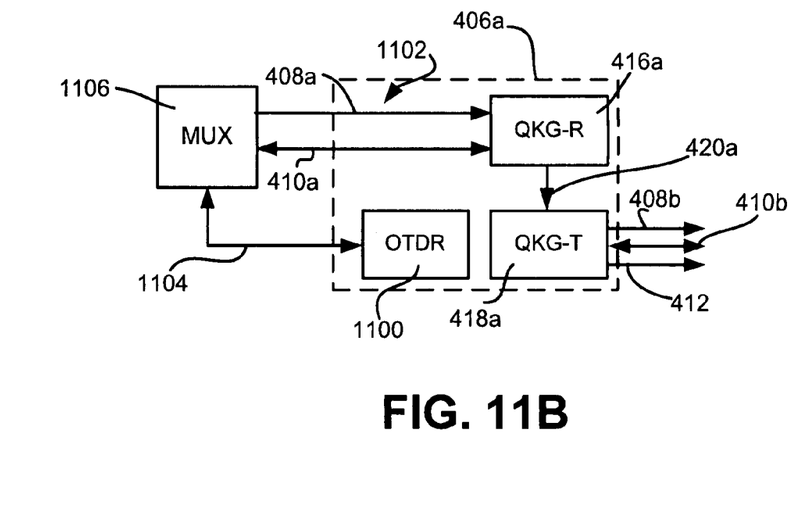

FIG. 11B is a block diagram similar to FIG. 11A, illustrating OTDR 1110 positioned upstream of intermediate key forwarding device 406a. In a manner similar to that described above, OTDR 1110 may inject a high intensity light pulse upstream through fiber 1104, multiplexer 1106 and fiber 1102 to identify potential eavesdropper-caused anomalies.

CONCLUSION

Systems and methods consistent with principles of the invention implement a system and method of propagating quantum keys through a long haul optical network. Furthermore, such a system may be simplified by using a single transmission medium to carry both public and quantum information across spans in the network.

The foregoing description of exemplary embodiments of the invention provides illustration and description, but is not intended to be exhaustive or to limit the invention to the precise form disclosed. Modifications and variations are possible in light of the above teachings or may be acquired from practice of the invention. For example, while certain components of the invention have been described as implemented in software and others in hardware, other configurations may be possible. Furthermore, while wavelength division multiplexing has been described above, time division multiplexing may be used, alternatively, or in conjunction with wavelength division multiplexing, for transmitting the signals over a quantum channel. Additionally, while exemplary embodiments of the present invention have been described as using optical QKG signals (i.e., photons) for encoding and transmitting cryptographic keys, it will be appreciated that other non-optical signals that include, for example, individual atoms, electrons, etc., may alternatively be used. In embodiments employing non-optical signals, the individual quantum particles (e.g., atoms, electrons) may be modulated to encode cryptographic key symbols.

While series of acts have been described with regard to FIG. 7, the order of the acts may vary in other implementations consistent with the invention. Also, non-dependent acts may be performed in parallel. No element, act, or instruction used in the description of the application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise. The scope of the invention is defined by the following claims and their equivalents.

What is claimed is:

1. A method for distributing quantum cryptographic keys, comprising:
    receiving, at an intermediate key forwarding device, a first quantum signal from an initial quantum key generating transmitter;
    corresponding, by the intermediate key forwarding device, with the initial quantum key generating transmitter to generate a first quantum key;
    transmitting, by the intermediate key forwarding device, a second quantum signal to a recipient quantum key generating transmitter;
    corresponding, by the intermediate key forwarding device, with the recipient quantum key generating receiver to generate a second quantum key;
    encoding, by the intermediate key forwarding device, the first quantum key using the second quantum key; and
    transmitting, by the intermediate key forwarding device, the encoded first quantum key to the recipient quantum key generating receiver,
    wherein receiving the first quantum signal and corresponding with the initial quantum key generating transmitter each occur via a single combined channel that includes the first quantum signal and a public data signal alternating in a time shared manner, and
    wherein receiving the first quantum signal and corresponding with the initial quantum key generating transmitter further comprises:
        splitting the single combined channel signals into a first split signal and a second split signal;
        applying a low attenuation to the first split signal when the first split signal includes the first quantum signal;
        applying a high attenuation to the first split signal when the second split signal includes the public data signal;
        receiving the first split signal at an intermediate quantum key generating receiver;
        receiving the second split signal at an intermediate quantum key public data receiver;
        applying a high attenuation prior to splitting the single combined channel signals when the first split signal includes the first quantum signal; and
        applying a low attenuation prior to splitting the signal combined channel when the first split signal includes the first public data signal.

2. The method of claim 1, where the first quantum signal includes at least one photon having a predefined polarization state.

3. The method of claim 1, where the first quantum signal is received from the initial quantum key generating transmitter via the first quantum signal during a first time slice, and where the corresponding with the initial quantum key generating transmitter to generate a first quantum key occurs via the public data signal during a second time slice different than the first time slice.

4. The method of claim 1, where the transmitting a second quantum signal to a recipient quantum key generating transmitter occurs via a second quantum channel,
where the corresponding with the recipient quantum key generating receiver to generate a second quantum key occurs via a second public channel, and
where the transmitting the encoded first quantum key to the recipient quantum key generating receiver occurs via a first ciphertext channel.

5. The method of claim 1, where the single combined channel is a wavelength division multiplexing (WDM) channel.

6. The method of claim 5, where the WDM channel includes a data carrying portion and a supervisory control portion, and
where the first quantum signal is carried in the supervisory control portion.

7. The method of claim 6, where the WDM channel is configured to receive quantum signals in an optical supervisory channel included therein.

8. The method of claim 7, where the WDM channel is configured to receive quantum signals in a blue optical supervisory channel included therein.

9. A system for distributing a quantum cryptographic key, comprising:
a quantum key generating transmitter configured to transmit a first quantum signal over a first network span, wherein the first network span includes a single combined channel that includes the first quantum signal and a public data signal alternating in a time shared manner;
an intermediate key forwarding device comprising:
a splitter to receive a signal from the quantum key generating transmitter, via the single combined channel, and split the received signal into a first split signal and a second split signal;
an intermediate quantum key generating receiver to receive the first split signal;
a first attenuating device to apply a low attenuation to the first split signal when the first split signal includes the first quantum signal,
wherein the first attenuating device is configured to apply a high attenuation to the first split signal when the second split signal includes the public data signal;
a second attenuating device to apply a high attenuation prior to splitting the single combined channel signals when the first split signal includes the first quantum signal and a low attenuation prior to splitting the single combined channel signals when the first split signal includes the first public data signal; and
a public data receiver to receive the second split signal, wherein the intermediate key forwarding device is configured to correspond with the quantum key generating transmitter via the single combined channel, to generate a first quantum key based on the first quantum signal, and transmit a second quantum signal over a second network span; and
a second quantum key generating receiver configured to receive the second quantum signal from the intermediate key forwarding device, and correspond with the intermediate key forwarding device to generate a second quantum key based on the second quantum signal, wherein the intermediate key forwarding device is configured to encode the first quantum key based on the second quantum key and transmit the encoded first quantum key to the second quantum key generating receiver, and
wherein the second quantum key generating receiver is configured to receive and decode the encoded first quantum key.

10. The system of claim 9, where the first network span and the second network span have lengths less than about 80 km.

11. The system of claim 9, where the first network span includes a the single combined channel,
where the quantum key generating transmitter is configured to transmit the first quantum signal to the intermediate key forwarding device via the first quantum signal during a first time slice, and
where the intermediate key forwarding device and the quantum key generating transmitter correspond via the first public data signal during a second time slice different than the first time slice.

12. The system of claim 9, where the first attenuating device is configured to apply varying degrees of attenuation based on timings synchronized to the signal output from the quantum key generating transmitter.

13. The system of claim 9, where the intermediate key forwarding device comprises:
an intermediate quantum key transmitter configured to transmit the second quantum signal and the encoded first quantum key to the quantum key receiver.

14. The system of claim 13, where the intermediate quantum key receiver and the quantum key generating transmitter correspond to generate the first quantum key based on the first quantum signal.

15. The system of claim 13, where the intermediate quantum key transmitter is configured to transmit the second quantum signal and the encoded first quantum key to the second quantum key generating receiver.

16. A device for distributing a quantum key over a long haul network, comprising:
an intermediate key generating receiver configured to receive a first set of random quantum bits from an initial key generating transmitter via a single combined channel that includes the first set of random quantum bits and a public data signal alternating in a time shared manner, wherein the single combined channel is configured to receive the random quantum bits from the initial key generating transmitter in an optical supervisory channel included therein,
wherein the intermediate key generating receiver is configured to communicate with the initial key generating transmitter via the single combined channel to generate a first key based on the first set of random quantum bits,
wherein the intermediate key generating receiver is further configured to:
split the first set of random quantum bits and the public data signal from the single combined channel signals into a first split signal and a second split signal;
apply a low attenuation to the first split signal when the first split signal includes the first set of random quantum bits;
apply a high attenuation to the first split signal when the second split signal includes the public data signal;
receive the first split signal at an intermediate quantum key generating receiver;
receive the second split signal at an intermediate quantum key public data receiver;
apply a high attenuation prior to splitting the single combined channel signals when the first split signal includes the first set of random quantum bits; and apply a low attenuation prior to splitting the single combined channel when the first split signal includes the public data signal; and an intermediate key generating transmitter configured to transmit a second set of random quantum bits to a recipient key generating receiver, communicate with the recipient key generating receiver to generate a second key based on the second set of random quantum bits, encode the first key using the second key, and transmit the encoded first key to the recipient key generating receiver using the second key.

17. The device of claim 16, where the applying low and high attenuation is performed by a variable optical attenuator.

* * * * *